(12) United States Patent
Peng et al.

(10) Patent No.: US 8,520,371 B2
(45) Date of Patent: Aug. 27, 2013

(54) DIGITAL PHOTO FRAME

(75) Inventors: Jiu-Cheng Peng, Shenzehn (CN);
Ping-Chou Chen, New Taipei (TW);
Chi Tang, Shenzhen (CN); Jian Liu,
Shenzhen (CN)

(73) Assignees: **Hong Fu Jin Precision Industry
(ShenZhen) Co., Ltd.**, Shenzhen (CN);
Hon Hai Precision Industry Co., Ltd.,
New Taipei (TW)

( * ) Notice: Subject to any disclaimer, the term of this patent is extended or adjusted under 35 U.S.C. 154(b) by 263 days.

(21) Appl. No.: 13/187,520

(22) Filed: Jul. 21, 2011

(65) Prior Publication Data
US 2012/0236475 A1    Sep. 20, 2012

(30) Foreign Application Priority Data
Mar. 16, 2011 (CN) .......................... 2011 1 0063094

(51) Int. Cl.
*H05K 5/00* (2006.01)
*G06F 1/16* (2006.01)
*A47B 97/04* (2006.01)
*A47G 1/16* (2006.01)

(52) U.S. Cl.
USPC ............ 361/679.01; 361/679.06; 361/679.07; 248/917; 248/918; 248/919; 248/920; 248/921; 248/922; 248/923; 248/924; 248/447; 40/747; 40/748; 40/753

(58) Field of Classification Search
USPC .............. 361/679.01–679.3, 679.55–679.59; 248/917–924, 447, 454, 458; 312/223.1, 312/223.2; 40/747, 748, 749, 753
See application file for complete search history.

(56) References Cited

U.S. PATENT DOCUMENTS

| | | | |
|---|---|---|---|
| 5,329,712 A * | 7/1994 | Keller | 40/747 |
| 7,301,759 B2 * | 11/2007 | Hsiung | 361/679.27 |
| 7,744,055 B2 * | 6/2010 | Zeng et al. | 248/447 |
| 7,836,623 B2 * | 11/2010 | Wang et al. | 40/747 |
| 8,152,113 B2 * | 4/2012 | Chen et al. | 248/150 |
| 2006/0049327 A1 * | 3/2006 | Chen | 248/371 |
| 2006/0221264 A1 * | 10/2006 | Ogawa et al. | 348/794 |
| 2007/0062089 A1 * | 3/2007 | Homer et al. | 40/754 |
| 2009/0026339 A1 * | 1/2009 | Chen | 248/349.1 |
| 2009/0223102 A1 * | 9/2009 | Li et al. | 40/763 |
| 2011/0164358 A1 * | 7/2011 | Duan et al. | 361/679.01 |
| 2011/0279962 A1 * | 11/2011 | Chiang et al. | 361/679.21 |

\* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A digital photo frame includes a body, a back shell defining a hole and a rotary support. The rotary support is rotatably connected to the back shell, includes a rotary base rotatably received in the hole, a connection member pivotedly connected to the rotary base, and an elongated support body slidably coupled to the connection member. The connection member includes a spring tab, a support body defining a plurality of channels. The channels are arranged along a lengthwise direction of the connection portion. the spring tab is selectively snappingly engaged in one of the channels. One of the rotary base and the back shell includes a plurality of protrusions, and the other one of the rotary base and the back shell defines a plurality of notches corresponding to the protrusions, the protrusions are snappingly engaging in the respective notches.

12 Claims, 7 Drawing Sheets

DIGITAL PHOTO FRAME

BACKGROUND

1. Technical Field

The present disclosure relates to digital photo frame, especially to an digital photo frame with an adjustable support.

2. Description of Related Art

A portable digital photo frames usually includes a support. The support can usually only supports the photo frame in one or two orientations, which can not meet a user's need in specific condition. More over, digital photo frames include many ports, which need one or more covers to cover the ports for preventing dust entering the ports. It is desirable and useful if the support can support the digital photo frame in more orientations and can cover the ports.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
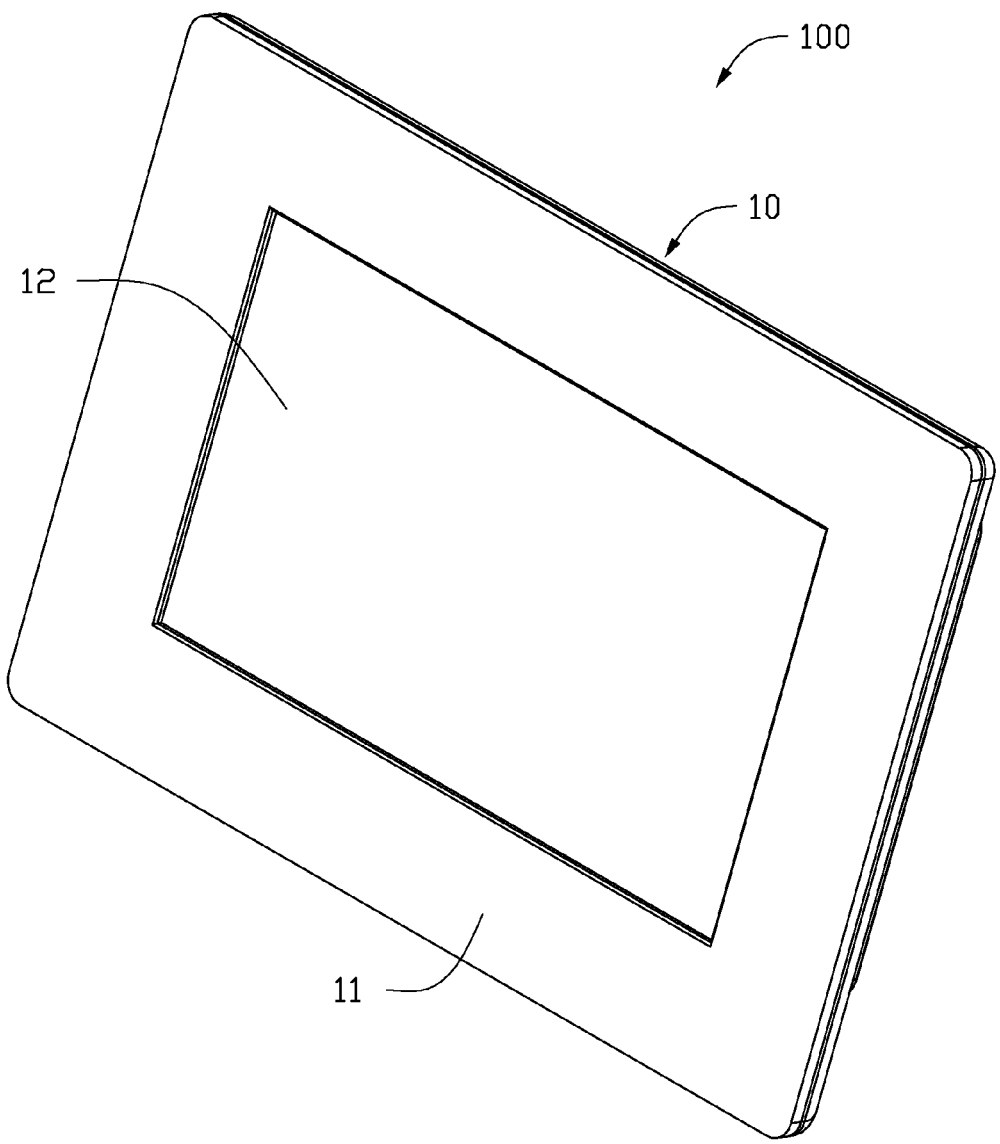
FIG. 1 is an isometric view of a digital photo frame according to an exemplary embodiment.
Figure 2:
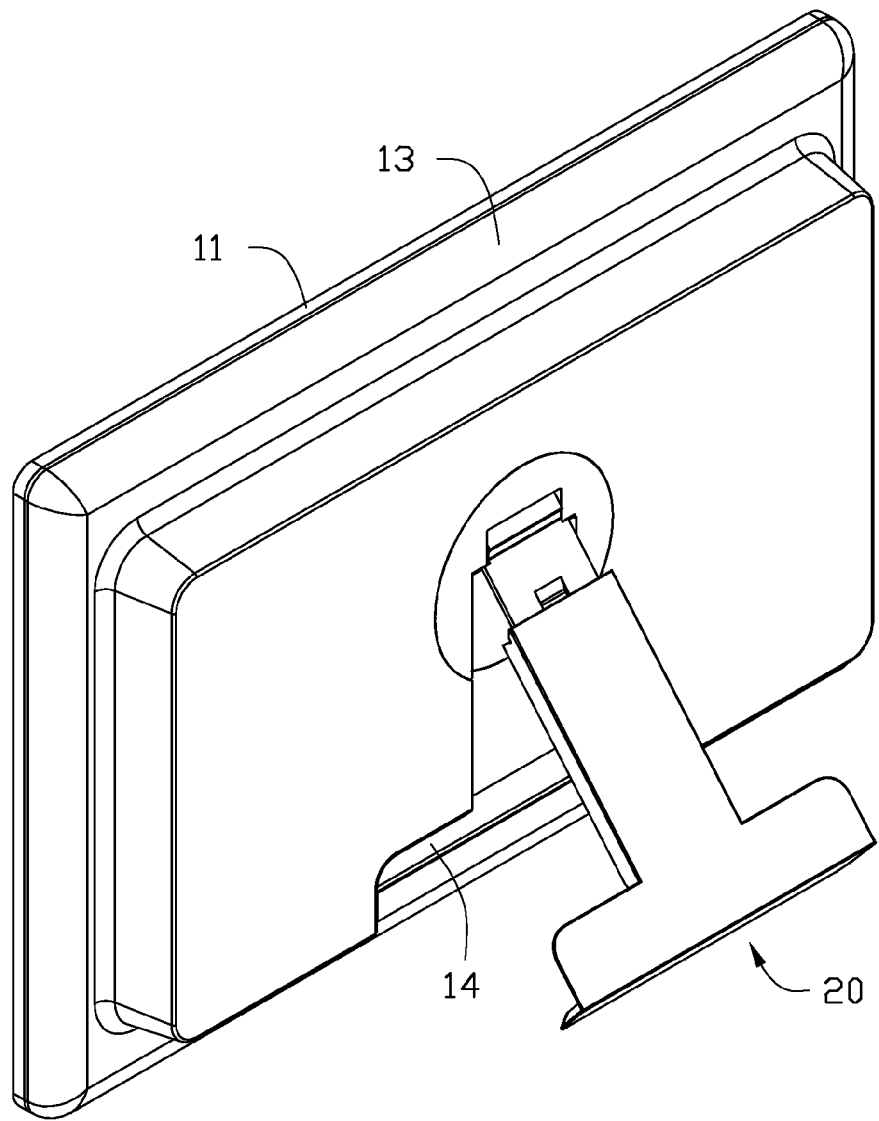
FIG. 2 shows the digital photo frame in a first orientation.

Referring to FIGS. 1-2, a digital photo frame 100 according to an exemplary embodiment includes a body 10 and a rotary support 20 connected to the back of the body 10. The rotary support 20 is configured to support the main body 10.

Figure 3:
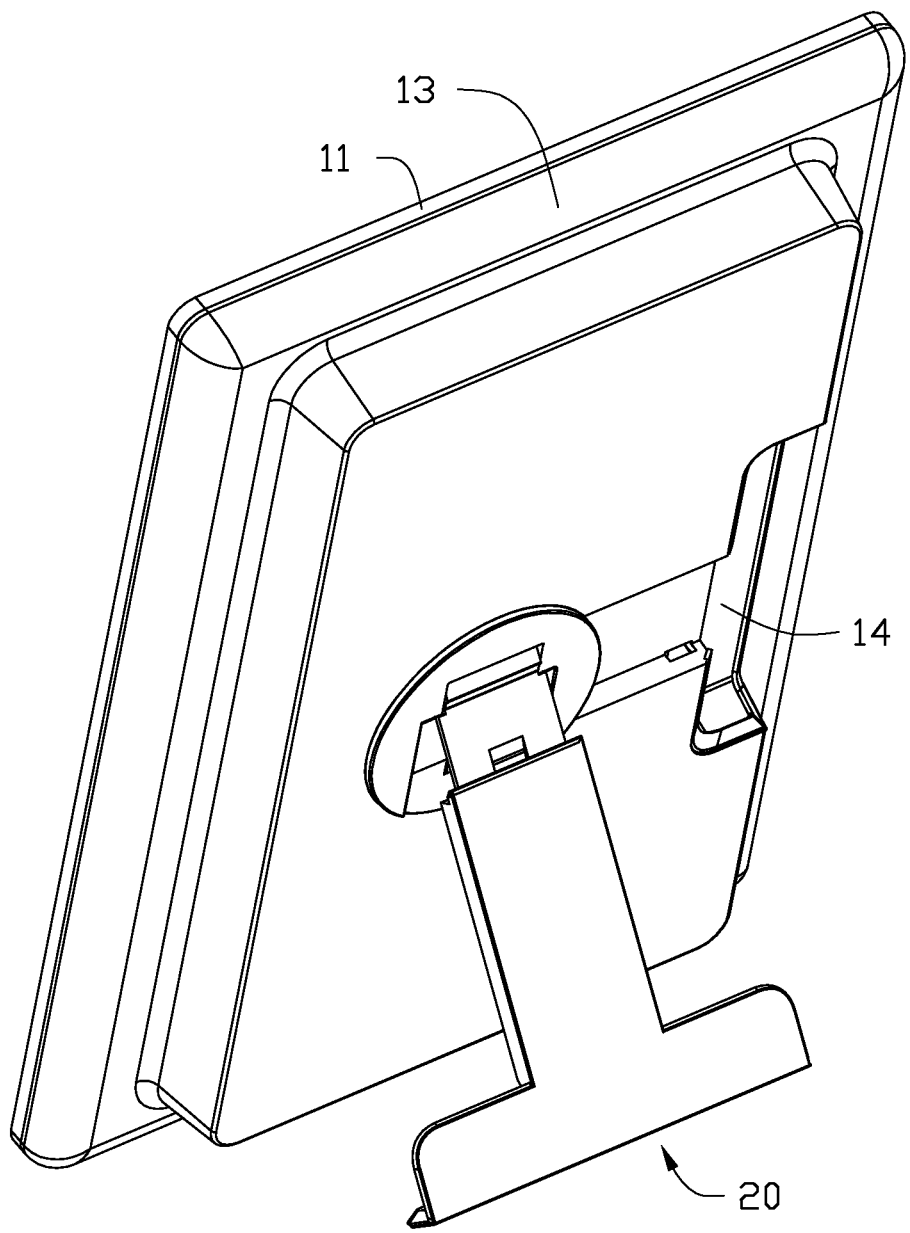
FIG. 3 is similar to FIG. 2, but showing the digital photo frame in a second orientation.
Figure 4:
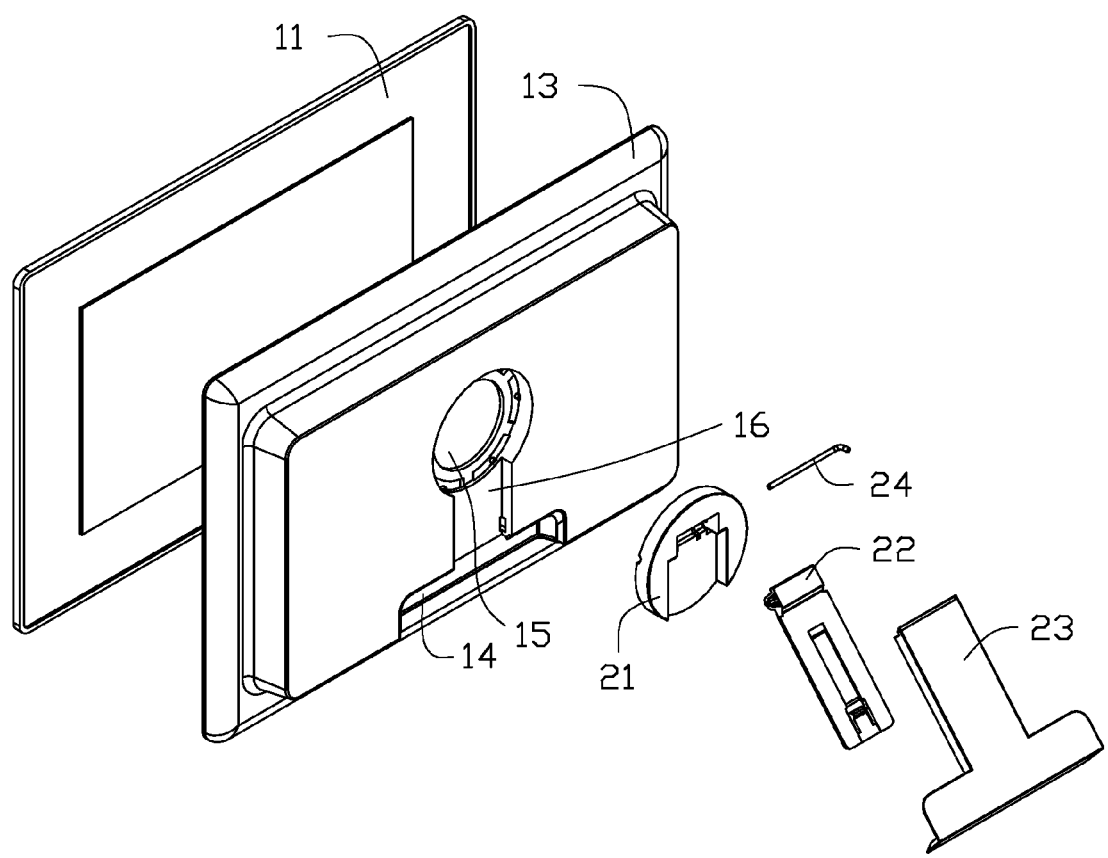
FIG. 4 is an isometric, exploded view of the digital photo frame of FIG. 1.

The body 10 includes a front shell 11, a display screen 12 and a back shell 13. The front shell 11 and the back shell 13 cooperatively define a space to receive the display screen 12 and a circuit board (not shown), and the display screen 12 is exposed at the front shell 11. Referring to FIGS. 3 and 4, in the embodiment, a recess 14 is defined in the back shell 13 and a number of connector ports (not shown) are arranged in the recess 14. A round hole 15 is defined approximately in the center of the back shell 13, and is in communication with the recess 14 through a channel 16. The rotary support 20 is received in the space defined corporately by the round hole 15, the channel 16 and the recess 14. In the embodiment, when the rotary support 20 is closed, the free end of the rotary 20 is fit in and covers the recess 14, and thus can prevent dust from entering the connector ports in the recess 14.

Figure 5:
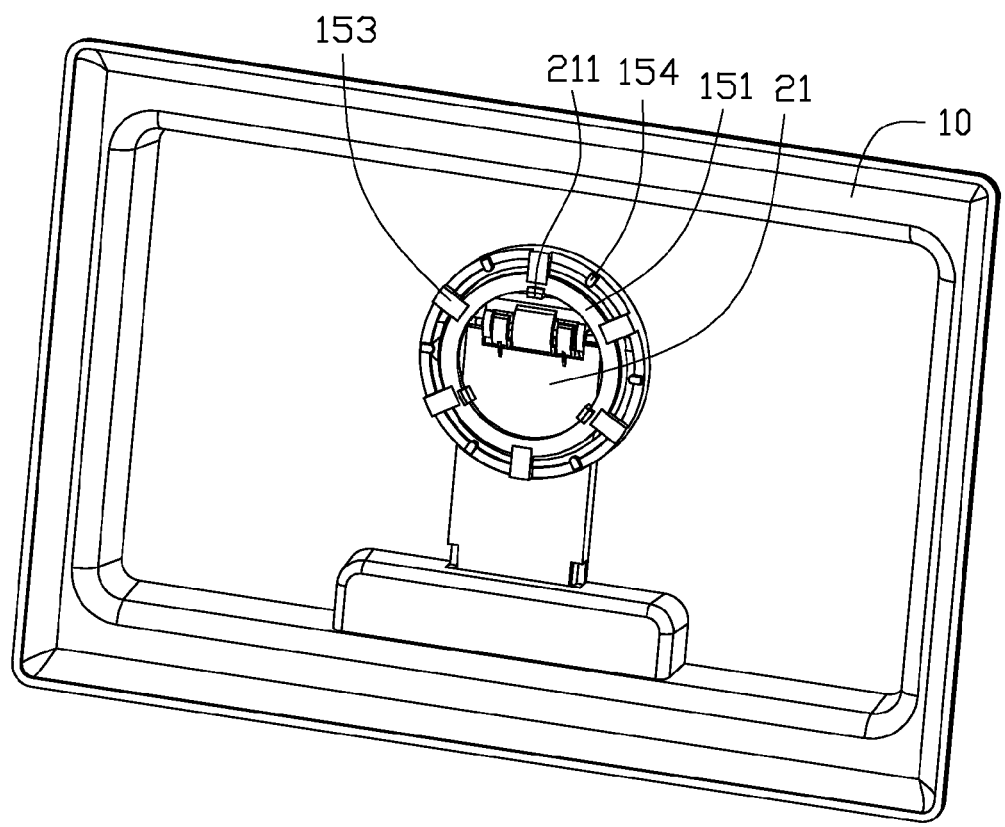
FIG. 5 is an isometric view of the digital photo frame of FIG. 1 with certain elements omitted for clarity.
Figure 6:
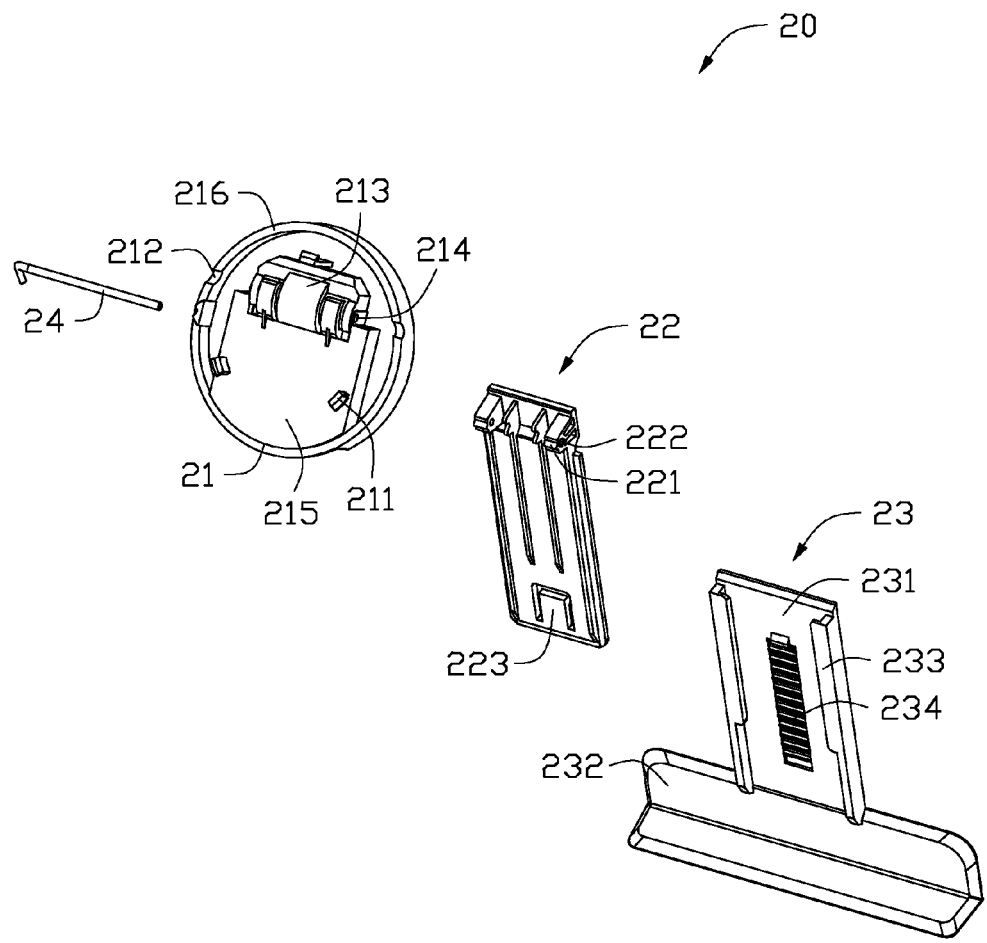
FIG. 6 is an isometric, exploded view of a rotary support of the digital photo frame of FIG. 1.

Referring to FIGS. 5 and 6, the fixing end of the rotary support 20 is fixed in the round hole 15. A number of protrusions 153 extend inwardly from the lateral surface of the round hole 15. The ends of the protrusions 153 are connected together via a circular ring 151. A number of protrusions 154 that are equidistantly spaced apart from each other extend from the lateral surface of the round hole 15.

The rotary support 20 includes a rotary base 21, a connection member 22 and an elongated support body 23. The rotary base 21 includes a body portion 215 and a side surface 216 extending around the body portion 215. A number of latching members 211 are protruded from one side of the body portion 215 and clasps the edge of the circular ring 151, thereby rotatablely connecting the rotary base 21 to the back shell 13. A number of notches 212 are equidistantly spaced apart from each other and are defined in the side surface 216 facing the circular ring 151 and can receive the protrusions 154 therein to keep the rotary support 20 in a preset position relative to the back shell 13.

In an alternative embodiment, the protrusions 154 may be formed on the side surface 216 and the notches 212 may be defined in the lateral surface of the round hole 15. An arcuate portion 213 is formed on the bottom of the rotary base 21. A first though hole 214 penetrates through the arcuate portion 213. One end of the connection member 22 is arranged at the opposite side of the arcuate portion 213.

The connection member 22 is a substantially planar plate, and includes one end including two shaft engaging portions 221 formed at opposite sides of the end. Each shaft engaging portion 221 defines a second through hole 222. A pin 24 paralleling to the display screen 12 penetrates through the first through hole 214 and the second through hole 222, thereby rotatably connecting the connection member 22 to the rotary base 21. The other, opposite end of the connection member 22 includes a spring tab 223 received in a channel. The free end of the spring tab 223 includes a projection 224. In the embodiment, the spring tab 223 is integrally formed with the connection member 22.

Figure 7:
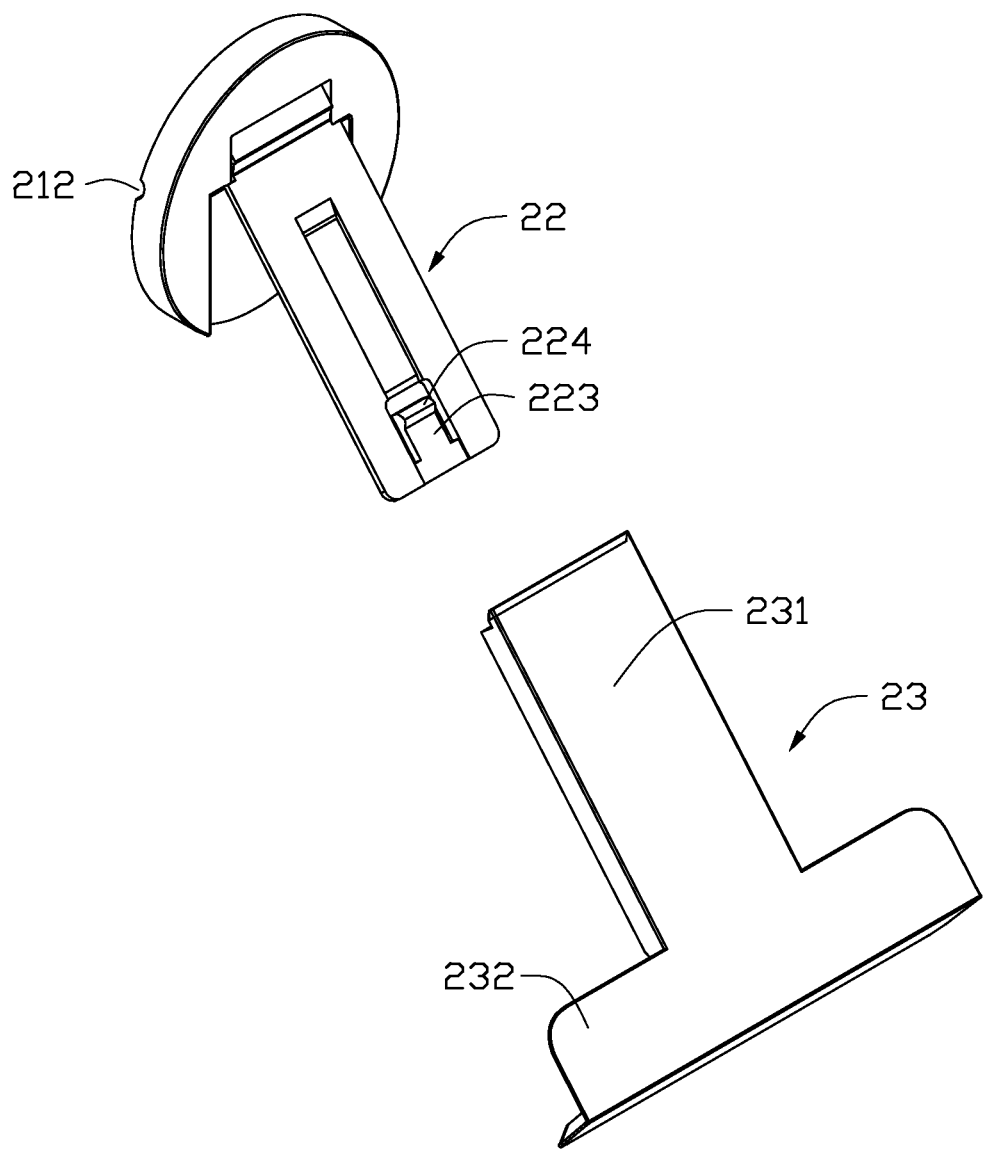
FIG. 7 is similar to FIG. 6, but viewed in a different viewpoint.

Referring to FIG. 7, the elongated support body 23 is T-shaped, and includes a connection portion 231 and a support portion 232 approximately perpendicular to the connection portion 231. Two sliding grooves 233 extend along opposite sides of the connection portion 231 and are used to slidably fit the opposite sides of the connection member 22 therein. A number of channels 234 are parallel with each other and are defined in the inner side of the connection portion 231 and are arranged along the lengthwise direction of the connection portion 231. The projection 224 of the spring tab 223 can be received in one channel 234, thereby retaining the elongated support body 23 in a desired position relative to the connection member 22. When pushing the elongated support body 23, the projection 224 can slide out of one of the channels 234 and slide into another of the channels 234 to reposition the elongated support body 23 with respect to the connection member 22. The support portion 232 has a configuration matching the recess 14 and can thus cover the ports of the digital photo frame in the recess 14.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A digital photo frame comprising:
a body comprising a front shell, a display screen exposed at the front shell, and a back shell defining a hole; and a rotary support rotatably connected to the back shell, the rotary support comprising a rotary base rotatably received in the hole of the back shell, a connection member pivotedly connected to the rotary base, and an elongated support body slidably coupled to the connection member, the connection member comprising a spring tab, the support body defining a plurality of channels, the channels, as a whole, arranged along a lengthwise direction of the connection portion, the support being slidable relative to the connection member along the lengthwise direction, the spring tab configured for selectively snappingly engaging in one of the channels to secure the support body in a desired position relative to the connection member; wherein one of the rotary base and the back shell comprises a plurality of protrusions, and the other one of the rotary base and the back shell defines a plurality of notches corresponding to the protrusions, the protrusions are snappingly engaging in the respective notches.

2. The digital photo frame of claim 1, wherein a recess is defined in the back shell, the body comprising a plurality of connector ports exposed in the recess.

3. The digital photo frame of claim 2, wherein a channel is defined in the back shell, the hole is in communication with the recess through the channel, and the rotary support is received in the channel and the recess.

4. The digital photo frame of claim 1, wherein a plurality of protrusions extend inwardly from an inner sidewall of the back shell in the hole, a circular ring is formed in the hole and connected with the protrusions.

5. The digital photo frame of claim 4, wherein the rotary base includes a body portion, a plurality of latching members are protrude from the body portion and clasp the circular ring to rotatably connect the rotary base to the back shell.

6. The digital photo frame of claim 1, wherein the protrusions are equidistantly spaced apart from each other, the notches are equidistantly spaced apart from each other and are defined in the rotary base.

7. The digital photo frame of claim 1, wherein the connection member is pivotable about a pivoting axis parallel to the display screen.

8. The digital photo frame of claim 1, wherein the rotary base is rotatable in the hole about a rotating axis perpendicular the display screen.

9. The digital photo frame of claim 1, wherein the spring tab is integrally formed with the connection member.

10. The digital photo frame of claim 1, wherein the support body comprises a connection portion and a support portion approximately perpendicular to the connection portion, the channels are parallel with each other and perpendicular to the lengthwise direction of the connection portion.

11. The digital photo frame of claim 10, wherein the support portion has a configuration conforming to the recess.

12. The digital photo frame of claim 2, wherein the support portion has a configuration conforming to the recess.

* * * * *